May 9, 1950     M. H. MESNER     2,507,170
TIMING MODULATION
Filed Oct. 23, 1946     2 Sheets-Sheet 1
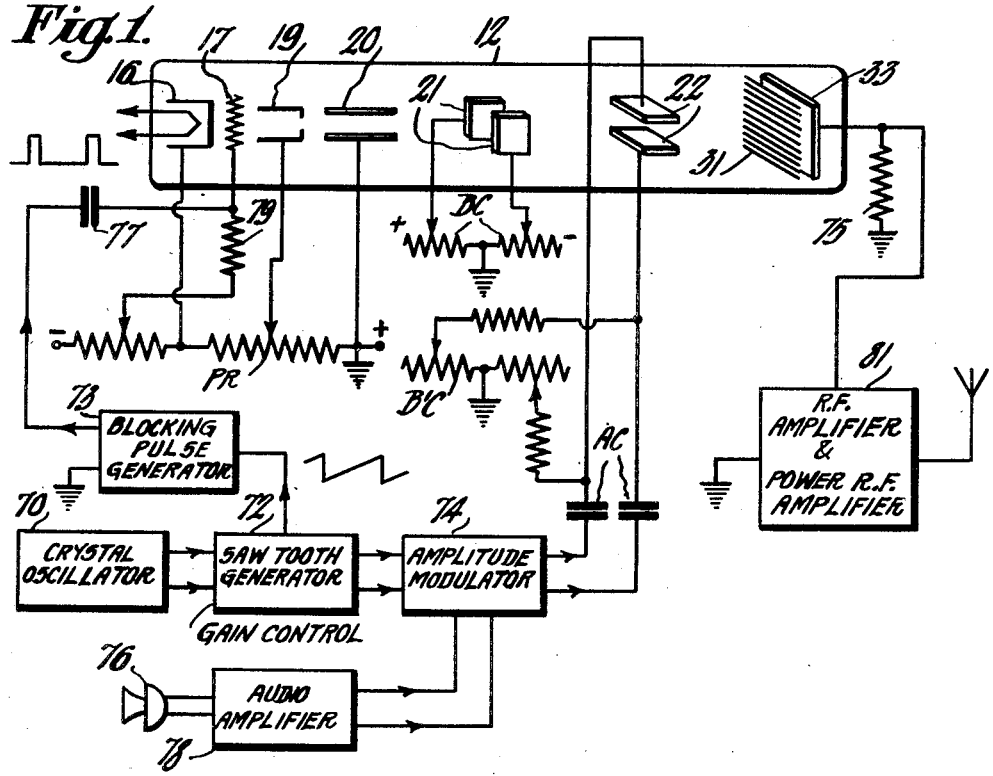
INVENTOR
Max H. Mesner
BY
H. S. Grover
ATTORNEY

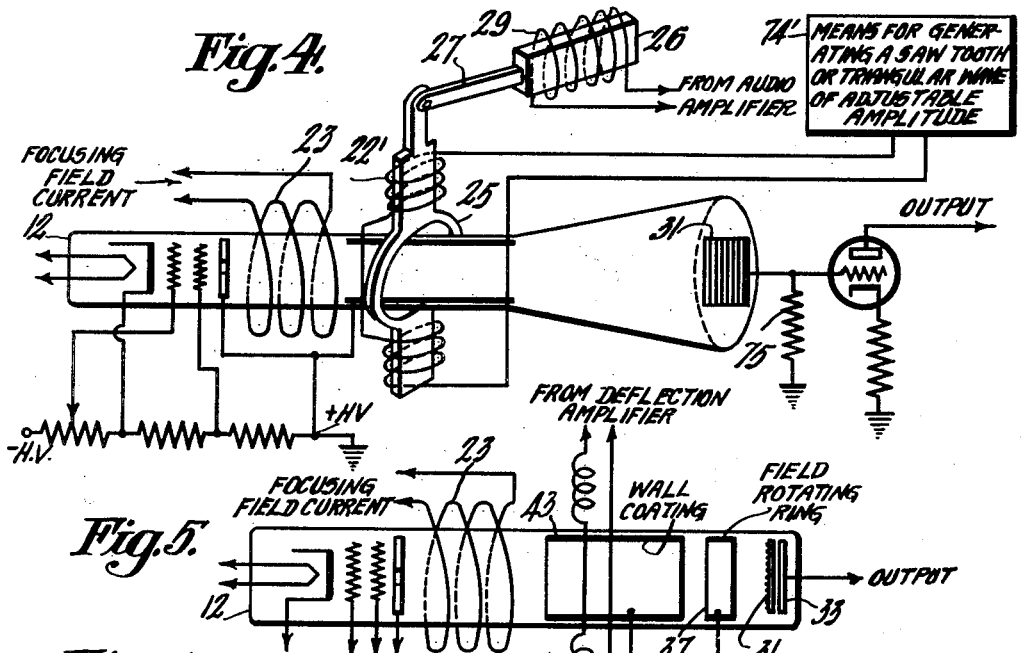
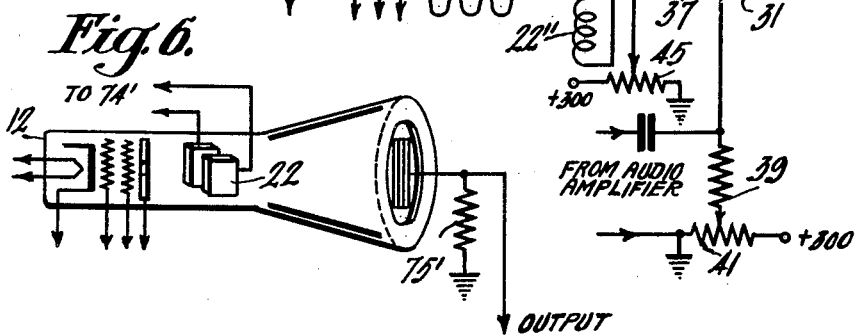
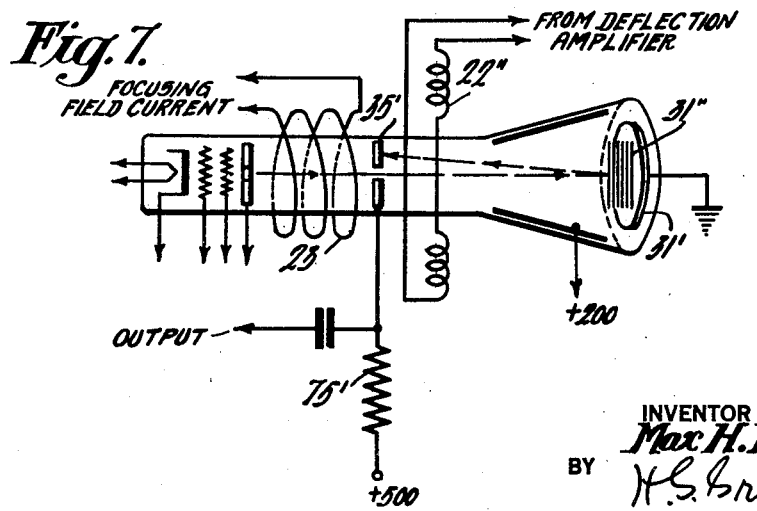

Patented May 9, 1950

2,507,170

UNITED STATES PATENT OFFICE 2,507,170

TIMING MODULATION

Max H. Mesner, Princeton, N. J., assignor to Radio Corporation of America, a corporation of Delaware Application October 23, 1946, Serial No. 705,006

7 Claims. (Cl. 332—25)

1

This application discloses an improved method of and means for the production of wave energy the timing of which is modulated by signals, control potentials, etc.

The general object of my invention is improved timing modulation of wave energy in accordance with signals or other control potentials or current.

Various methods and means of producing timing modulated wave energy are known in the prior art. These methods and means in general are quite complicated in operation and makeup, and make use of several tubes and tube circuits to accomplish the timing modulation. A more specific object of my invention is a simple and improved and straightforward method of and means for directly modulating the timing of wave energy.

In some FM systems known today, a carrier wave is modulated in phase by corrected modulation potentials and then multiplied in frequency the amount required to get the final deviation necessary to derive the benefits of FM.

An object of my invention is to provide substantially directly a large percentage deviation of the carrier, the average frequency of which is such that little or no multiplication thereof is necessary to obtain the said required final carrier frequency and percentage deviation.

In attaining these objects, I make use of a cathode ray tube in a novel circuit arrangement to modulate directly in the tube the timing of oscillatory energy. The tube structure is conventional in some respects and follows practice disclosed in my U. S. application Serial #559,469, filed October 19, 1944. Such tubes comprise an electron stream directed between deflecting elements at a target consisting of parallel conductors or bars with the deflection element excited by wave energy, and arranged to deflect the beam in a path transverse to the length of the bars and thereacross an extent depending on the wave amplitude. The wave, which may be of saw tooth form, has its amplitude controlled by signals or control potentials. In the absence of modulation, the beam sweeps across the bars at a fixed rate and between limits (which are fixed by the oscillatory energy amplitude) so that if it is a 100 kc. saw tooth wave and the sweep extends over 500 bars, the output is 50 mc. When modulation is applied the period of sweep is not changed but the extent of sweep is changed and as a consequence, the rate of sweep. This change in rate of sweep measures the frequency modulation, and

2 since a saw tooth wave is used, the frequency modulation is proportional to the amplitude modulation on the saw tooth wave. If the applied wave energy is crystal controlled, then the center frequency of the timing modulated energy is substantially fixed.

Cathode ray tubes have been used in timing modulation systems. However, in these systems, phase modulation of pulse output is carried out. Insofar as I know, no timing modulator of the cathode ray type has a sine wave output.

An object of the present invention is to provide a frequency modulator of the cathode ray tube type, the output of which is of sine wave form. This object is attained in accordance with my invention in various manners. In one embodiment, the cathode ray beam is diffused from the center outward so that the electron density becomes less near the edges of the beam. Thus, as the beam sweeps across individual bars, the signal produced will be relatively weak as the edge of the spot strikes the bar and strongest when the center is over the bar and then progressively weaker as the beam passes on. The beam is diffused by a defocusing action of the ray tube electrodes. This makes is possible to produce an output signal that is sinusoidal.

When a monoscope type target is used and the output depends on secondary emission, the sinusoidal output may be developed using a small well focused spot and causing the secondary emission characteristics of the element to be greater in the center of the bar and less at the edges. As the beam approaches an element, it passes gradually from a region of low secondary emission to one of greater secondary emission and through a maximum at the element's center.

A further object of my invention is to provide means for converting small changes in movement which might represent signals or be caused by signals, into large changes in the frequency of alternating current. This object is attained in modifications of my invention by rotating the field of deflection in accordance with the modulation so that the angular relation between the path through which the beam sweeps and the length of the bars is changed. If the sweep is nearly parallel to the length of the bars of the target, small variations in the amplitude of control or modulation potentials produce large frequency changes. Where the modulation is converted to movement, small changes thereof acting on deflecting windings produce large frequency changes.

In describing my invention in detail, reference will be made to the attached drawings, wherein:

Fig. 1 illustrates by circuit element and circuit element connection, a timing modulator arranged in accordance with my invention. In Fig. 1, rectangles are used to illustrate certain features which may be conventional and to which per se no claim is made herein.

Fig. 2 illustrates diagrammatically the target electrode of Fig. 1 and is used to describe the manner in which timing modulation of the oscillatory energy is obtained in accordance with one method of operation and by use of the embodiment of my invention illustrated in Fig. 1.

Fig. 2a illustrates the bar or element density of secondary emissive material where sine wave output is desired.

Figs. 3 and 4 illustrate a modification of the arrangement of Fig. 1. In Fig. 1, deflection is normal to the length of the bars of the anode. In the embodiment of Fig. 4, the deflection is in a direction along a path, of constant length, which makes a variable angle with a line normal to the length of the bars as shown in Fig. 3. The angle at which the scan crosses the bars is varied at the modulation frequency rate and hence, the number of bars traversed is varied as is the frequency of the output.

Fig. 5 illustrates a modification of the arrangement of Fig. 4. In Fig. 4, mechanical means is used to change the angle of the beam sweep whereas electronic means accomplishes this purpose in Fig. 5.

Figs. 6 and 7 illustrate, respectively, the manner in which output is taken directly from beam action and by use of secondary emission struck from the target by beam action.

In Fig. 1, 12 is a cathode ray tube having a cathode 16, a grid 17, first and second anodes 19 and 20, beam centering electrodes 21, deflecting electrodes 22 and a target anode 31 comprising as shown in detail in Fig. 2, a plurality of parallel bars insulated each from the other. The tube may be of the monoscope type, in which the target is coupled to the output electrodes by capacity or by secondary emission. The target may be a fine bar pattern printed in the usual manner across the target. Two-tone printing using carbon and aluminum is one of the methods of monoscope construction. Another type of construction adaptable is the ruled target in which mica is coated with a thin layer of metal and fine lines thereon scratched by means of a ruling machine. A further method is to evaporate metal on to an insulating sheet through a fine grating or to produce a fine mesh screen using that as a target. An output anode electrode 33 in the form of a metallic surface back of the bars 31 collects a charge depending upon the rate and extent of deflection of the beam. Beam centering potentiometer resistance arrangements BC and B'C are connected with the deflecting electrodes 21 and 22 and used in a well known manner to center the beam in both axes as desired. The beam producing electrodes including the cathode, control grid and anodes may be charged as desired from a potentiometer arrangement PR connected to a source of potential as shown.

A source of oscillations 70, which may be of constant frequency and comprise a crystal controlled oscillation generator and multipliers or dividers, supplies oscillatory energy to a saw tooth wave generator 72 and thence to an amplifier and amplitude modulator 74. The oscillator 70, saw tooth generator 72 and amplifier and modulator in 74 may be conventional. For example, the crystal oscillator may be of any approved type, while the saw tooth generator may be as disclosed in my aforementioned application, and the amplitude modulator may be of the plate, grid or cathode modulation type. The source of signals is applied at 76 and fed through a signal amplifier 78 to the modulator. The amplitude modulated saw tooth wave form output from amplifier and modulator 74 goes on to the deflecting plates 22.

The operation of this embodiment is as follows:

The tube 12 consists of an electron gun in which the beam strikes one of the fine lines or bars on the target 31. The beam is scanned at a fixed repetition rate by the output from amplifier 74 and sweeps across the number of bars falling within the limits A of Fig. 2. If there is no modulation applied thereto the beam traverses a like number of bars of target 31 on each alternation of the oscillator and saw tooth generator output. This may be considered the carrier condition in the system. The frequency of operation is the frequency of the saw tooth generator output multiplied by the number of bars of target 31 traversed by the beam over a complete cycle. Now consider the case where the saw tooth wave is amplitude modulated. (A triangular wave may also be used.) The amplitude of the saw tooth relative to the special dimensions of the bar pattern determines the rate at which the beam traverses a bar or a definite number of bars, and hence the instantaneous frequency. Thus, the modulation of the saw tooth amplitude produces rate change of bar traversing at a modulation frequency rate and hence frequency modulated signals.

In the target shown in Fig. 2, the time period during which the beam sweeps over spaces A, B and C is the same. The sweep A (carrier condition) traverses sixteen bars so the carrier frequency is 16N where N is the frequency of the source 72. If the saw tooth wave is modulated up so that the beam sweeps over the twenty bars within the range "B," the frequency goes up to 20N. If the saw tooth wave is next modulated down the beam sweeps over twelve bars in the range C and the frequency goes down to 12N.

In practice, the target might have 1000 bars or 500 bars. If it is assumed that 500 bars are scanned by a 20 kc. saw tooth wave, the resulting wave frequency is ten megacycles. If the saw tooth wave is modulated to have a ±2% change in amplitude, then the resultant frequency swings from 9.8 to 10.2 megacycles or ±200 kc. deviation. A slight discontinuity may occur at the end of each scan, in this case every fifty microseconds. If it is assumed that the return sweep is instantaneous, this discontinuity is not serious because even though a receiver would be excited by an energy pulse on each return sweep, the same are above audible frequency and blocking of the receiver by the pulses would not be noticed. If the return sweep is slow, blanking may be used. Blanking on the return sweeps may be carried out in a conventional manner. As a matter of fact, the blanking means may be as disclosed in my U. S. application, Serial #559,469, filed Octoer 19, 1944. In the embodiment described here, 73 is a blocking pulse generator of the locking tube circuit type controlled by the saw tooth energy out of the generator 72. These locking circuit arrangements as presently known, are basically as disclosed in Finch U. S. Patent #1,844,950. The locking circuit may be selfblocking and tripped by peaks of the saw tooth wave to generate a pulse when the saw tooth voltage reaches peak value and starts to fall to deflect the cathode ray beam on the return sweep. This pulse out of the blocking pulse generator is in the negative direction and is applied by condenser 77 to the cathode ray tube grid 17 over resistance 79 to cut off the beam. Then the modulator output is interrupted for a short time and the receiver does not get any signal. This signal interruption is above audibility and is not heard in the receiver.

If a triangular wave is used, no blanking is necessary. The beam traverses the bars in both directions at the same rate and the frequency modulation is continuous.

If the saw tooth wave is linear (used part of cycle) the modulation is linear also, being proportional to the amplitude of the saw tooth wave. The excitation of the deflecting elements is regulated by adjustment of the bias centering resistances B'C and regulation of a gain control means, which may be a controlled amplifier in unit 72, to adjust the amplitude of the saw tooth wave applied to the deflecting elements. The saw tooth wave is adjusted for the sweep necessary to produce the desired carrier frequency. Modulation potentials then vary the wave amplitude above and below this value to accomplish modulation. If the saw tooth wave is uniform and symmetrical and alternating coupling condensers AC are used between the amplifier in 74 and the deflecting elements 22, beam centering is facilitated because direct current is removed from the amplifier output. Preferably, the amplifier in unit 74 is of the push-pull type.

The output appears across resistor 75 and is fed to a radio frequency amplifier, power amplifier and if necessary, frequency multiplier in unit 81.

The deflecting elements may be plates or magnetic windings, but have been shown as plates in the modification of Fig. 1. Moverover, other methods of varying the number of bars scanned, in accordance with the modulation, may be used in accordance with my invention. In the embodiment of Fig. 4, I have illustrated electrical and mechanical means for changing the beam sweep in accordance with the modulation. The method carried out here consists in scanning with a saw tooth or triangular wave as before, but in this case rotating the direction of scan relative to the longitudinal axis of the bars. Here I use magnetic deflection and mechanically rotate the deflection coil. This is rotated acoustically from a speaker diaphragm used to translate mechanical motion into frequency changes using mechanical linkage. Such a method is useful when the frequency out is relatively low (even in the audio range), and a small change in mechanical position is desired to make a large change in audio frequency. When the scanning approaches a path parallel to the bar pattern, a very small change in angle will produce a very high percentage change in frequency. This is illustrated in Fig. 3. If the direction at which the scan path crosses the bars is varied from A' to B' at a modulation frequency rate, the rate of traversing bars is varied as is the total number of bars traversed, so that frequency modulation is accomplished.

If a 500-line target is scanned by a 100 kc. saw tooth, a 50-megacycle signal results. To get a ±75 kc. deviation, the total swing in frequency would be 150 kc. or 0.3% of the carrier. If the neutral scanning angle with respect to the lines is 45°, then the total swing in angle is only ten minutes. If the scanning is brought more nearly parallel to the bars, the angular swing becomes even less. Hence, the rotation transmitted by a mechanical linkage as shown in Fig. 4, is sufficient to produce the frequency modulation required. The FM signals, properly discriminated, may be used to act as a sensitive indicator for small mechanical deviations.

In the embodiment of Fig. 4, the cathode ray tube is in general as in Fig. 1, except for the following features: The beam is focused by a field produced by winding 23 connected to and excited by a source of direct current. The beam deflecting element 22' now is in the form of a magnetic winding. Moreover, the winding is mounted for angular rotation about an axis which substantially coincides with the beam axis. This mounting may comprise a yoke 25 which is rotated part of a degree by the mechanical motion of an element, such as a speaker diaphragm, driving element 26 through mechanical linkage 27. The element 26 is driven by the varying field of a winding 29 excited by control potentials or modulation currents. The deflection winding 22' is coupled to the saw tooth wave source 74'. The saw tooth wave in this embodiment is not modulated and sweeps the beam through a path of fixed but adjustable length. The return sweep may be blanked as in Fig. 1 or a triangular wave may be used. The signal target 31 may be like the target in Fig. 1 and comprise a plurality of insulated bars in front of a conductive plate such as the plate 33 of Fig. 1.

The deflection path may be angularly varied in accordance with modulation or control currents by electronic means. An embodiment using this means is shown in Fig. 5. Here the electronic method shown makes use of the effect of a varying electrostatic field in conjunction with an electromagnetic field at right angles to it. The electron beam then tends to go at right angles to both fields. If the electric field is produced by a ring as shown, then changing the ring voltage will rotate the pattern. The tube 12 then has an electrostatic field rotating ring 37 to which the modulation or control potential is applied over a resistor 39 connected to a ring charge adjusting potentiometer 41. The electrode 43, which is an anode in the form of a conductive coating on the tube envelope, is also variably charged by a potentiometer 45 connected to a positive source of direct current potential. The deflecting winding 22'' is in this embodiment fixed with respect to the beam axis and is excited by saw tooth or triangular wave form potentials of constant peak magnitude from the source 74'. The field rotating ring 37 produces an electrostatic field at right angles to the magnetic field. The electrons tend to move at right angles to both. By varying the potential on 37, the scanning pattern is rotated with respect to the target to accomplish frequency modulation as pointed out in detail in connection with Fig. 4.

The above described technique illustrates one method of rotating the pattern, as is done in some orthicons. Other methods of pattern rotation may be used, these being well known to those skilled in the art.

The signal from this cathode ray tube may be derived in any one of several ways, keeping in mind the relative range of frequencies to be swept. The bar pattern may be connected electrically to an output amplifier. It may be coupled capacitively to a signal plate, as in the orthicon, iconoscope, and some storage tubes. An amplifier may be connected to a collector plate which collects secondaries, or the signal may be obtained from an electron multiplier, as is done in the SDT-5 tubes and in the image orthicon. If the output is to be in the H. F. or U. H. F. bands, then the tube construction may lend itself to forming part of the tuned circuit or resonant line. In cases like this, connection directly to the bar pattern, or to a collector element, might prove more advantageous.

Where modulation is carried out as illustrated in Figs. 1 and 5, the output may be taken from a plate capacitively coupled to the insulated bars of the target as shown in said figures (see in particular Fig. 5), or if desired, the bars may be conductively tied together and connected directly to the output or signal load 75', as illustrated in Fig. 6. Sine wave output may be had in either case by diffusing the beam as described previously, or in the case of the capacitively coupled target, or the monoscope type target as illustrated in Fig. 7, when secondary emission effects are used, the individual elements of the target may have a cross section of variable secondary emissive qualities as illustrated at 31' in Fig. 2a. The monoscope target pattern may be replaced by a fine mesh screen.

However, a monoscope type cathode ray tube may be used, and the output may be taken as illustrated in Fig. 7. Secondary radiation from the target 31'' falls on the collector of secondary electrons 35' and the output current is frequency modulated in accordance with signals. Moreover, by decreasing the ability of the individual bars of the target to radiate secondary electrons from the center of the bar outward in each direction, the corners of the individual pulses are rounded off to provide output of sine wave form. Diffusing the beam to decrease its concentration from the center outward has the same effect. The beam focusing winding 23 and deflecting winding 22'' of Fig. 7 may be as described in connection with Fig. 5.

What is claimed is:

1. In a frequency modulation system, an electron discharge tube of the cathode ray type having beam producing electrodes, beam deflecting means and a target electrode comprising a plurality of parallel bar-like conductive elements in a plane substantially normal to the path of the electron beam, an output impedance wherein is developed a potential each time said beam falls on one of said elements, a source of oscillatory energy the wave form of which includes linear portions recurring at a fixed frequency, means coupling said source to said beam deflecting means for sweeping said beam in a path crossing the longitudinal axes of a substantially fixed number of said elements per cycle of oscillatory energy, a source of control potential, and apparatus cooperating with said beam deflecting means and excited by control potential from said source of control potential and acting on said beam to vary the number of bars of said target across which said beam sweeps in accordance with said control potential to correspondingly vary the frequency of said potentials developed in said output impedance.

2. In a frequency modulation system, an electron discharge tube of the cathode ray type having beam producing electrodes, beam deflecting means and a target electrode comprising a plurality of parallel bar-like conductive elements in a plane substantially normal to the path of the electron beam, said elements each having a response characteristic which diminishes from the center thereof outward in either direction, an output impedance wherein is developed a potential each time said beam falls on one of said elements, a source of oscillatory energy the wave form of which includes linear portions recurring at a fixed frequency, means coupling said source to said beam deflecting means for sweeping said beam in a path crossing the longitudinal axes of a substantially fixed number of said bars per cycle of oscillatory energy, a source of control potential, and apparatus excited by control potential source from said control potential and acting on said beam to vary the number of elements of said target across which said beam sweeps in accordance with said control potential to correspondingly vary the frequency of said potentials developed in said output impedance.

3. In a timing modulation system, an electron discharge device having an anode electrode comprising a plurality of parallel bar-like conducting elements, electron beam producing electrodes for producing a beam of electrons and directing the same towards said anode, said elements lying in a plane substantially normal to the path of said beam, deflecting elements adjacent the path of said beam, a source of oscillatory energy the wave form of which includes linear portions recurring at a substantially fixed frequency, a coupling between said source and said deflecting elements for sweeping the beam across said bars in a path normal to the length of said bars, an output circuit for selecting from said anode electrode oscillating voltages having a strong component of a frequency equal to the frequency of said source times the number of conducting elements traversed by said beam, a source of modulating potentials, and means for modulating the amplitude of the wave energy fed to said deflecting elements from said source in accordance with said modulating potentials to vary the number of conducting elements traversed by said beam to thereby modulate the frequency of the strong component.

4. In a timing modulation system, an electron discharge tube of the cathode ray type having beam producing electrodes, beam deflecting elements and a target electrode comprising a plurality of parallel bar-like conductive elements insulated each from the other and coupled to a common output impedance, said conductive elements lying in a plane substantially normal to the path of the electron beam, a source of oscillatory energy coupled to said deflecting elements for sweeping said beam in a path crossing the longitudinal axes of a substantially fixed number of said bars per cycle of oscillatory energy, a source of control potentials, means associating said source of control potentials with said source of oscillatory energy and with said deflecting elements in such a manner as to vary the sweep of said beam across said bars and correspondingly vary the number of bars swept by said beam per cycle of oscillatory energy, and an output circuit coupled to said common impedance.

5. In a frequency modulation system, an electron discharge device having a target electrode comprising a plurality of parallel conducting elements, electron beam producing electrodes for producing a beam of electrons and directing the same toward said target electrode, deflecting elements adjacent the path of said beam, a source of oscillatory energy of triangular wave form, a coupling between said source and said deflecting elements for sweeping the beam across said target in a path crossing said conducting elements, an output circuit for selecting from said target a recurring voltage having a frequency equal to the frequency of said source times the number of conducting elements traversed by said beam, and means for angularly moving the effective field of said deflecting elements in accordance with modulating signals to vary the number of conducting elements traversed by said beam to thereby modulate the frequency of the recurring voltage.

6. In a frequency modulation system, an electron discharge tube of the cathode ray type having beam producing electrodes, a beam deflecting winding mounted for rotation and a target electrode comprising a plurality of parallel bar-like conductive elements insulated each from the other and coupled to a common output impedance, a source of oscillatory energy, the wave form of which includes linear portions recurring at a fixed frequency, coupled to said deflecting winding for sweeping the beam of electrons in a path across a substantially fixed number of said elements per cycle of oscillatory energy, a source of control potentials, and mechanical means for rotating said deflecting winding including a magnetic winding coupled to said source of control potentials, to vary the path of sweep of said beam across said bars to thereby correspondingly vary the number of elements swept across by said beam per cycle of oscillatory energy.

7. In a frequency modulation system, an electron discharge tube of the cathode ray type having beam producing electrodes, direct current beam focusing means, a beam deflecting winding, a field deflecting ring and a target electrode comprising a plurality of parallel conductive elements in the path of the beam of electrons, said elements lying in a plane substantially normal to the path of said beam, an output impedance wherein is developed a potential each time said beam falls on one of said elements, a source of oscillatory energy the wave form of which includes linear portions recurring at a fixed frequency, means coupling said source to said beam deflecting winding for sweeping said beam in a path across a substantially fixed number of said elements per cycle of oscillatory energy, a source of control potential coupled to said field deflecting ring to vary the sweep of said beam and the number of elements of said target across which said beam sweeps in accordance with said control potential to correspondingly vary the frequency of the potential developed in said output impedance.

MAX H. MESNER.

REFERENCES CITED

The following references are of record in the file of this patent:

UNITED STATES PATENTS

| Number | Name | Date |
| --- | --- | --- |
| 2,254,036 | Gray | Aug. 26, 1941 |
| 2,280,707 | Kell | Apr. 21, 1942 |
| 2,290,587 | Goldstine | July 21, 1942 |
| 2,443,958 | Kimball | June 22, 1948 |